No. 724,661. PATENTED APR. 7, 1903.
A. DE BRETTEVILLE.
FEED WATER HEATER AND FILTER.
APPLICATION FILED APR. 3, 1902.
NO MODEL.
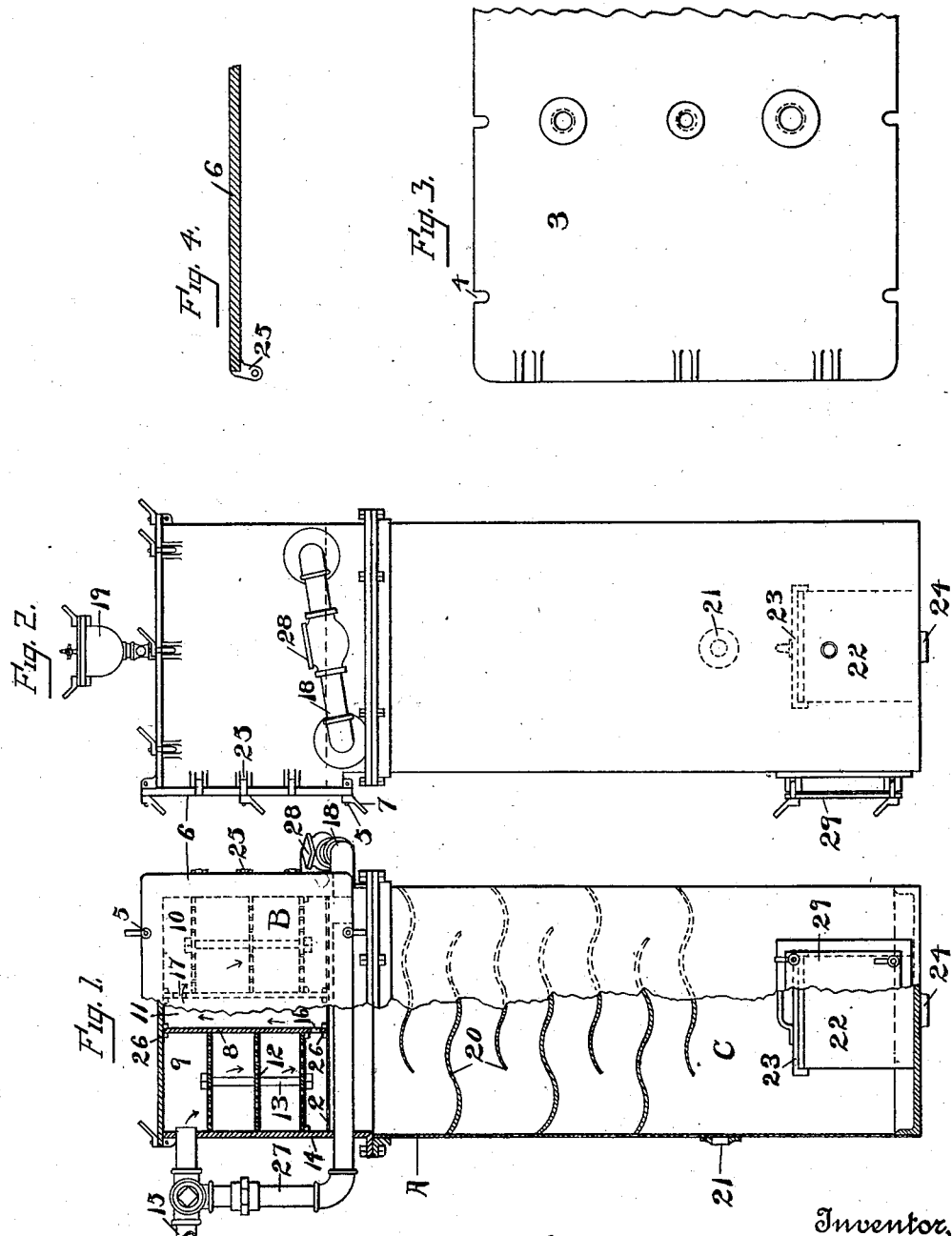

UNITED STATES PATENT OFFICE.

ALEXANDER DE BRETTEVILLE, OF SAN FRANCISCO, CALIFORNIA.

FEED-WATER HEATER AND FILTER.

SPECIFICATION forming part of Letters Patent No. 724,661, dated April 7, 1903.

Application filed April 3, 1902. Serial No. 101,174. (No model.)

*To all whom it may concern:*

Be it known that I, ALEXANDER DE BRETTEVILLE, a citizen of the United States, residing in the city and county of San Francisco, State of California, have invented an Improvement in Feed-Water Heaters and Filters; and I hereby declare the following to be a full, clear, and exact description of the same.

My invention relates to improvements in means for purifying and heating water before it is admitted to the boiler, and it is particularly intended for use in connection with marine engines.

The condensed steam from the cylinders in which it has been used for lubricating purposes carries more or less oil, which must be separated before it can be used in the boilers. It is also necessary that any salts, mineral, or other foreign substances in any of the water so to be used must be removed.

The object of my invention is to effect a separation of the oil by filtration before the water is heated, subsequently removing the mineral matters by passing the water over heated surfaces, and delivering it thus heated and purified directly to the pumps and boilers. Heretofore it has been customary to heat up the water immediately on being admitted to the heater and while in this condition to run it through the filters. The objection to such a procedure is that the heating of the water before the oil is removed tends to volatilize the oil and render final separation more difficult.

The invention consists of a casing inclosing independent upper and lower chambers, filter-compartments in the upper chamber, means for admitting water successively to said filters, through each of which it flows in downward course, connections through which the filtered water is delivered into the lower chamber, plates over which said water passes, means by which said chamber and plates are heated, and comprises details which will be more fully set forth hereinafter, having reference to the accompanying drawings, in which—

Figure 1 is a view, partly in section and partly in elevation, of my invention. Fig. 2 is a view at right angles to Fig. 1. Fig. 3 shows top plate of filter-chamber. Fig. 4 is a sectional view of the front plate.

A represents a rectangular casing made in two parts and inclosing chambers B and C, separated by the partition 2. The upper part of the casing is composed, preferably, of cast-metal plates and capable of being put together without the use of rivets or like means. To this end I employ plates, as 3, Fig. 3, having the slots 4 around their edges, which are adapted to receive the hinged bolts 5 upon adjacent plates 6. These plates are fitted together and suitably packed, and by means of the tightening-nuts 7 a water and steam tight chamber is produced. The lower part of the casing is bolted to the upper part. The upper chamber B is divided, by means of the vertical partitions 8, into two filter-compartments 9 and 10, between which is an intervening space 11. The filter material is laid between horizontal perforated plates 12, united by bolts carrying spacing-sleeves 13, the lowermost plate in each compartment being supported on ledges 14.

The water to be purified is admitted from the pipe 15 into chamber B to the first of the filters 9. Thence it passes downward to the bottom of the chamber and through an opening 16 into the space 11, and rising flows through an opening 17 to the top of the second filter. It again passes downward through filtering material and is discharged through a pipe 18 into the second or lower chamber C. A sludge-pot 19 is inserted into the top of chamber B above the filter-compartment 10, into which the oil rising to the surface is collected, whence it can be easily skimmed off. This part of the apparatus is designed to first separate the oil and grease from the water and such other foreign substances as can be removed otherwise than by heat. Much of the oil and dirt will be caught in the first filter. By bringing the water up through the space 11 the oil and water have a further chance to separate or stratify, and being cold and free from agitation at this point practically all the oil and grease can be skimmed off at the top of filter 10. The reason then is obvious for thus interrupting the process of filtering rather than pass the impure water down through one filter and up through a succeeding one. When the water finally leaves the filters and passes through the pipe 18 into chamber C, it is practically freed of oil, grease, and other foreign matters, except such soluble salts as can only be separated by heat. A series of undulating shelves 20 are disposed in the upper part of chamber C, over which the water flows, and the exhaust-steam is admitted into this chamber below the shelves through the opening 21. The heat of this steam passing between the plates 20 will cause any lime or like impurities held in the water to be deposited upon the plates. The water constantly overflows these plates and falls into the bottom of the chamber, in which is a cast filter-box 22, having a removable perforated cover 23. The water rising in the chamber overflows through this cover and passes thence down through the filtering material to the hot-water outlet 24 to the suction-pump. Thus purified and highly heated it is in the best possible condition for use in the boilers.

The front plate of chamber B is hinged, as at 25, Fig. 4, so that by simply loosening the nuts 7 and turning back the bolts 5, by which its edges are held, the plate can be turned as a door to give access to the filters 9 and 10 for purposes of inspection, cleansing, or renewal. The filters can be removed and the interior of the chamber dismantled at a moment's notice by simply withdrawing the partitions 8 from the guides 26 on the upper and lower castings. Whenever it is desired to clean out the chamber B, the water from inlet-pipe 15 may be diverted through a by-pass 27 directly into chamber C, so that the apparatus is continuous in operation. A check-valve 28 in pipe 18 prevents return of water into the upper chamber. The chamber C has a hinged door 29 opposite the filter-box 22, similar in construction and operation to the door in chamber B, just described. Thus access can be had to any part of the apparatus. It can be quickly dismantled, and its elements are easily assembled. Moreover, by the arrangement of the cooling filtering-chambers and the lower heating-chamber the purified water comes in contact with the hot steam immediately before it passes to the pumps and boilers, thereby giving the best results.

Having thus described my invention, what I claim, and desire to secure by Letters Patent, is—

1. The combination in a feed-water heater and purifier, of a casing inclosing upper and lower chambers; a closed partition separating one chamber from the other; horizontal partitions forming filter-compartments; vertical partitions forming substantially a still-water chamber, said last-named chamber communicating at its lower portion with the discharge from a filter-chamber; means for admitting water to the upper portion of the filter-compartments whereby the water gravitates through the filter; means connecting the upper and lower chambers; means for heating the water in the lower chamber; and an outlet from the lower chamber.

2. The combination in a feed-water heater and purifier, of a divided casing forming independent upper and lower chambers; a vertical series of horizontal, foraminous partitions upon each side of the center of the upper chamber and forming filters; separated vertical partitions between the series of horizontal partitions and forming substantially a central still-water chamber between said filters; means connecting the lower portion of the central chamber with the discharge from the filter at one side and means connecting the upper portion of the central chamber with the upper portion of a succeeding filter; means connecting the discharge of the final filter with the lower chamber of the casing; means for heating the water in the lower chamber; and a discharge from the latter chamber for filtered and purified water.

3. The combination in a feed-water heater and purifier, of a casing horizontally divided into independent upper and lower chambers; filters in the upper chamber one on each side of the vertical center thereof, and an intermediate chamber connecting at its lower portion with the bottom of the first filter, and connecting at its upper portion with the upper part of the final filter; means for admitting water to the upper part of the first filter; means for conducting filtered water from the final filter to the chamber in the lower portion of the casing; means for heating the water in the lower chamber; and an outlet from the lower chamber for filtered water.

4. The combination in a feed-water heater and purifier, of a casing inclosing an upper filter-chamber and a lower heating-chamber, connections between said chambers exterior to the casing, a check-valve in said connection, respective inlet and outlet pipes in the upper and lower chambers and a by-pass connecting the inlet-pipe with the lower chamber, whereby water may be admitted directly to the latter as when it is desired to cleanse the filters.

5. The combination in a feed-water heater and purifier of a casing inclosing upper and lower chambers, the upper chamber divided by vertical removable partitions, an intervening water-space therebetween, removable, horizontal perforated shelves in each of said filter-compartments, a hinged closure for said filter-chamber, undulating plates in the lower chamber a steam-inlet thereto, a filter-box in the bottom of said chamber inclosing a water-outlet and a removable closure whereby access may be had to said filter-box.

In witness whereof I have hereunto set my hand.

ALEXANDER DE BRETTEVILLE.

Witnesses:
S. H. NOURSE,
JESSIE C. BRODIE.